United States Patent [19]

Ibbott

[11] Patent Number: 5,387,324
[45] Date of Patent: Feb. 7, 1995

[54] METHOD FOR PROVIDING AN IONIC CHANGE IN FLUID

[76] Inventor: Jack K. Ibbott, 17-7; Nishiazabu 4-chome, Minato-ku, Tokyo 106, Japan

[21] Appl. No.: 916,254

[22] Filed: Jul. 21, 1992

[51] Int. Cl.⁶ .............................. C02F 1/46; C02F 5/00
[52] U.S. Cl. ..................................... 204/150; 204/130; 204/248
[58] Field of Search ............... 204/186, 302, 144, 149, 204/150, 248, 130

[56] References Cited

U.S. PATENT DOCUMENTS

| | | | |
|---|---|---|---|
| 672,230 | 4/1901 | Lacomme | 204/218 |
| 3,026,259 | 3/1962 | Phillips | 204/249 |
| 3,342,712 | 9/1967 | O'Keefe, Sr. | 204/148 |
| 3,686,092 | 8/1972 | Stehlin | 204/197 |
| 3,801,492 | 4/1974 | King | 204/302 |
| 3,871,989 | 3/1975 | King | 204/299 R |
| 3,873,438 | 3/1975 | Anderson et al. | 204/268 |
| 4,073,712 | 2/1978 | Means et al. | 204/186 |
| 4,378,276 | 3/1983 | Liggett et al. | 204/149 |
| 4,749,457 | 6/1988 | Yasuda et al. | 204/150 |
| 4,752,364 | 6/1988 | Dhooge | 204/151 |
| 4,902,391 | 2/1990 | Ibbott | 204/150 |
| 5,102,515 | 4/1992 | Ibbott | 204/150 |

FOREIGN PATENT DOCUMENTS

| | | |
|---|---|---|
| 463794 | 3/1937 | United Kingdom . |
| 1288552 | 9/1972 | United Kingdom . |

OTHER PUBLICATIONS

B. Q. Welder Practical Performance of Water-Conditioning Gadgets, Industrial and Engineering Chemistry, vol. 46, No. 5, May 1954, pp. 954-960.
Federal Trade Commission Decision in Evis Water Conditioner Claims, Jour. AWWA, Jan. 1959, pp. 708-710.
E. Nordell, Water Treatment For Industrial and Other Uses, second edition, Reinhold Publishing Corp., New York, 1961, pp. 268-272.
H. P. Godard, Editorial, "Watch Out For Wondrous Water Treatment Witchcraft", Materials Performance, Apr. 1974, p. 9.
Rolf Eliassen et al, "So-called Electrical and Catalytic Treatment of Water for Boilers", J. Am. Water Works Assn., Jul. 1952, pp. 576-582.
Rolf Eliassen et al, "Experimental Performance of 'Miracle' Water Conditioners", J. Am. Water Works Assn., Oct. 1958, pp. 1371-1385.
G. V. James, Water treatment, third edition, The Technical Press Ltd., London, 1966, pp. 164-167.

*Primary Examiner*—John Niebling
*Assistant Examiner*—William T. Leader
*Attorney, Agent, or Firm*—Wenderoth, Lind & Ponack

[57] ABSTRACT

A method and apparatus produces an ionic change in fluid by causing the fluid to flow in specified sequence over electrodes having different electrochemical potentials. The last electrode which the fluid contacts is so selected as to provide the desired ionic change. The electrodes are provided in a tube of electrically insulative material such as plastic. At least some of the electrically conductive material of one of the electrodes is disposed downstream of all of the electrically conductive material of the other of the electrodes, so that fluid flowing axially through the tube sequentially contacts the electrodes and is only acted on by the downstream electrode before flowing from the tube. By appropriately selecting the material of the downstream electrode, decoloration of fluid having metal oxides or a REDOX reaction can be carried out.

5 Claims, 3 Drawing Sheets

METHOD FOR PROVIDING AN IONIC CHANGE IN FLUID

BACKGROUND OF THE INVENTION

The present invention relates to a method and apparatus for effecting an ionic change in fluid to decolor the fluid or to carry out a REDOX reaction, for example.

One of the major problems with fluid containment systems is the deposition of metal oxides and other metal compounds on the inner surfaces of the containment system. These deposits of various metal oxides, in particular, iron oxides, and other metal compounds build up over a period of 5 to 10 years. After approximately 5 years, when a tap is first opened after a certain down time, for example, in the morning after the system has been shut down during the night, the first water flowing from the system exhibits the red/brown color of the iron oxides. After perhaps 10 years, this initial water can become quite strongly colored and a considerable amount of time is necessary to flush the system before suitably clear water can be obtained.

U.S. Pat. No. 4,902,391 discloses a method and apparatus developed by the present inventor for ionizing, with great efficiency, fluid having a high dissolved solid content for the purpose of eliminating the problems caused by the deposition of substances, such as ferric particles, on the inner surface of fluid piping. According to the method and apparatus disclosed in U.S. Pat. No. 4,902,391, two electrodes of electrically conductive material having different electrochemical potentials, e.g. aluminum and carbon electrodes, are used to provide a voltaic cell structure which employs fluid to be treated as the electrolyte of the cell, whereby the fluid is ionized owing to the electric potential of the electrodes. U.S. Pat. No. 3,342,712 and U.K. Patent No. 1,288,552 also disclose similar apparatus using two electrodes for the treatment of fluids.

Such apparatus are effective for removing an iron compound scale. However, the action of removing such a scale is relatively slow.

To overcome this disadvantage, the present inventor has developed a dual system using three electrodes which has been made the subject of U.S. patent application Ser. No. 07/657,813. In this system, a third electrode of a metal, for example iron, is used to produce a concentration of metal ions in the fluid to thereby inhibit large amounts of the same ions of other iron compounds from being released into the fluid. Such a three electrode device still employs two of the electrodes to keep the system clean by slowly removing the deposited metal compounds, but the coloration of the fluid is greatly reduced owing to the third electrode to allow normal use of the fluid.

In the research conducted with the dual system having the three electrode design, a satisfactory performance was achieved when the third electrode was made of iron and was incorporated within the original device having only two electrodes. However, when tests were made with an electrode directly in contact with a carbon electrode, but not contained within the body of the original device, the performance was not satisfactory and resulted in even worse coloration of the fluid. This lead to the thinking that the fluid flow and sequence in which the fluid contacted the electrodes could be a vital factor.

A prototype device was made in which two electrodes, carbon and iron, were disposed within a plastic tube such that fluid flowing through the tube would contact the electrodes in sequence. With such a model, a very obvious and strong effect was observed of inhibiting a piece of rusted iron immersed in the fluid from coloring the fluid.

For comparison testing, two pieces of similarly sized iron with similar rust conditions were provided, one piece being immersed in fluid together with the device having the two electrodes described above, and the other piece being immersed in a similar amount of fluid. After about five hours, the fluid with only the rusted iron piece was showing evidence of coloration which then became stronger over time. However, with the device comprising the two electrodes, the fluid showed only slight coloration after three days.

In order to confirm the effect attributed to the positioning of the electrodes, test devices were made as follows:

(1) A tubular iron section positioned coaxially between two tubular carbon sections and inserted into a length of plastic (insulating) tubing, so that the fluid could only contact the internal walls of the tubular sections. All tubular sections had similar inner and outer dimensions and the iron section was in direct contact with the carbon sections.

(2) A tubular carbon section positioned coaxially between two tubular iron sections and inserted into a length of plastic tubing as in item 1.

(3) An iron rod with carbon rods attached at each end of the iron rod.

Three small test containers were set up with equal volumes of fluid (water). Test devices (1), (2), and (3) were immersed in each of the test containers, respectively. The axial dimension of the pieces of plastic tubing of test devices (1) and (2) was oriented vertically with the upper end of the pieces of plastic tubing being located below the surface of the fluid in each of the respective containers. This caused the fluid to flow downward through the tubing as was observable by changes in coloration of the fluid described below. In addition, pieces of rusted iron having similar sizes and similar rust conditions were immersed in each of the test containers together with the test devices. The test units so constructed were allowed to stand and were examined from time to time to observe changes in color in the fluid.

Observations of the three test units described above show that the test unit with device (3), i.e. with the exposed carbon and iron rod structure, provided no inhibiting effect on the coloration of the fluid.

Test device (1) showed a strong control in inhibiting the coloration which would otherwise be caused by the iron oxide, whereas test device (2) showed an apparent increase in the rate and degree of coloration.

In order to fully confirm the results provided by these test devices, the fluid was drained from each container and the containers were carefully washed and cleaned to remove any residual stains of the iron oxide. The rusted test pieces of iron were each washed and the same test device with the same piece of rusted iron were then placed back into the container in which they had been previously placed. New fluid (water) was then added in equal volumes to the containers.

This cleaning of the test devices, the rusted iron and the containers and the replenishment of the containers with fresh fluid was repeated several times in order to confirm the reliability of the test results.

The above test results verified that a combination of carbon/iron/carbon electrodes in a tube, which ensured that the fluid contacted the carbon/iron/carbon material in that order, inhibited the colorization of the fluid. The other combination of iron/carbon/iron electrodes in a tube did not inhibit coloration, but could be useful in other applications. Finally, a combination of merely carbon/iron electrodes simply immersed in the fluid with no tube to ensure sequential contact of the fluid with the carbon/iron materials could be disregarded.

It is to be noted that the test device having the carbon/iron/carbon electrodes had been selected in order to investigate a device in which the fluid could flow in either direction through the tube. However, tests were also made with only iron and carbon electrodes provided within a tube of plastic which would be useful in a system in which the fluid could only flow in one specified direction. Tests with the combination of iron/carbon electrodes provided a satisfactory effect of reducing the coloration of the fluid when the fluid first contacted the iron electrode and then exited through the tube after contacting the carbon electrode.

Having confirmed that a necessary condition for decoloration is that the fluid exits the tube after contacting only the carbon electrode, the next point investigated by the present inventor was the conductive relationship between the carbon and iron electrodes. For this purpose, further tests were carried out with devices employing only a carbon electrode and an iron electrode provided within an insulating tube, with the fluid flowing in a specified direction through the tube so as to first contact the iron electrode and then contact the carbon electrode before flowing from the tube.

The following conductive relationships were established in the above-mentioned test devices:

(a) the electroconductive materials (iron and carbon) of the electrodes were placed in direct physical contact, (b) a resistor was connected between the electroconductive materials (iron and carbon) of the electrodes, and (c) the electroconductive materials (iron and carbon) of the electrodes were isolated both physically and electrically so that the fluid provided the only electroconductive connection between the electrodes.

The series of tests run with the devices above all showed satisfactory results in particular applications. For example, device (a) was suitable when the iron oxide coloration was severe and device (c) was suitable in the early stages of coloration.

From the above-described tests carried out by the present inventor, the present inventor has posited that an ionic change in the fluid can be attributed directly to the sequence in which the fluid flows over the electroconductive materials of the electrodes, irrespective of the manner in which the electrodes are electroconductively connected, although such an electroconductive connection seems to have a control on the rate of ionic change. Specifically, it appears that the material of the exit electrode can be selected to effect a desired ionic change in the fluid based on known properties (composition) of the fluid.

SUMMARY OF THE INVENTION

An object of the present invention is to provide a method and apparatus for producing an ionic change in fluid in which the fluid is caused to flow in a specified sequence over electrodes having different electrochemical potentials, with the material of the last electrode which the fluid contacts being so selected as to provide the desired ionic change in the fluid.

A more specific object of the present invention is to provide a method and apparatus as described above in which the ionic change in the fluid results in decoloration of the fluid.

The above objects are achieved according to the present invention by the provision of positive and negative electrodes of electrically conductive material within a tube of electrically insulative material, with the electrically conductive material of the negative electrode being of an element bearing an affinity to a compound in solution in the fluid, and with at least some of the electrically conductive material of one of the electrodes being disposed downstream of all of the electrically conductive material of the other of the electrodes so as to ensure that fluid flowing axially through the tube sequentially contacts the electrode.

BRIEF DESCRIPTION OF THE DRAWINGS

Further objects, features and advantages of the present invention will become apparent to those of ordinary skill in the art by reviewing the detailed description below of preferred embodiments in conjunction with the attached drawings, in which.

DETAILED DESCRIPTION OF THE PREFERRED EMBODIMENTS

Figure 1:
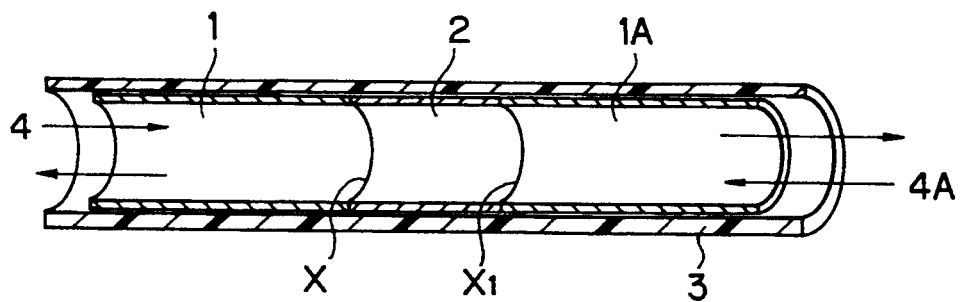
FIG. 1 is a perspective view, in section, of a first embodiment of an apparatus for providing an ionic change in fluid according to the present invention.

In the figures, reference numeral 1 is used to designate a positive electrode, reference numeral 2 is used to designate a negative electrode, and reference numeral 3 is used to designate a tube of electrically insulative material (plastic) in which the electrodes 1, 2 are arranged in such a manner as to ensure sequential contact of the electrodes by the fluid flowing through the tube 3.

In the embodiment of FIG. 1, the electrodes 1, 2 are tubular and have outer surfaces conformed to and extending along the inner peripheral surface of the tube 3 of electrically insulative material so as to be fitted therein. Furthermore, another electrode 1A of electrically conductive material, the same as that of the positive electrode 1, is disposed in the tube 3.

The electrodes 1, 2, 1A abut one another end-to-end in direct physical contact as indicated by reference characters x, x1. This embodiment has the advantage in that the fluid can flow in either of the directions indicated by arrows 4, 4A but will ensuredly contact only the electrically conductive material of electrode 1 or 1A before exiting the tube 3. In this case, the electrode 1 is a positive carbon electrode, the electrode 2 is a negative iron electrode, and the electrode 1A is therefore also a positive carbon electrode, for example.

Figure 2:
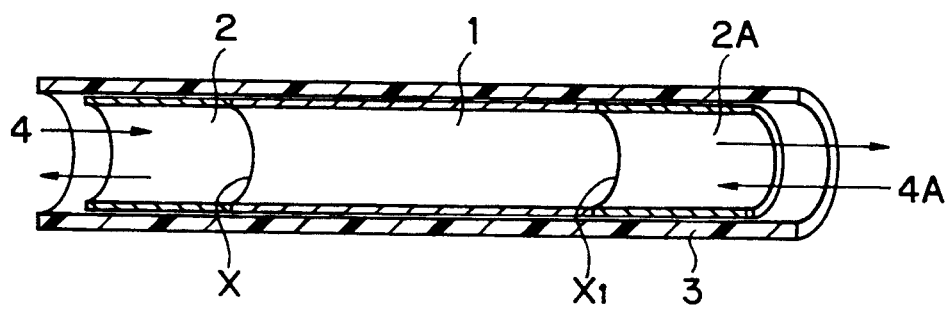
FIG. 2 is a similar view of another form of the embodiment shown in FIG. 1.

FIG. 2 shows a similar form of the present invention, but in which the positive and negative electrodes are reversed, with reference character 2A designating another negative electrode of iron, for example.

Although the tubular electrode shown in FIGS. 1 and 2 allow the fluid to flow therethrough so as to facilitate the sequential contact required by the present invention, electrodes of other configurations may be employed, so long as these electrodes have a somewhat long axial portion over which fluid can flow when the electrodes are provided in the tube, and which configurations facilitate the axial disposition of the electrodes within the tube.

Figure 3:
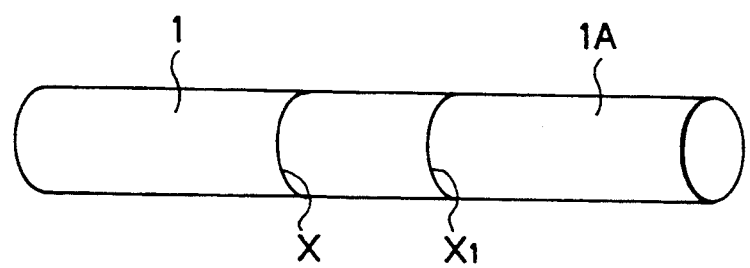
FIG. 3 is a perspective view of an essential part of a third embodiment according to the present invention.

Thus, in FIG. 3, the positive 1, 1A and negative 2 electrodes can be rod-shaped. These rod-shaped electrodes are advantageous in that they can be made smaller in overall size than the tubular electrodes of FIGS. 1 and 2 and thus can contribute to the overall compactness of the apparatus if required in a particular application.

Figure 4:
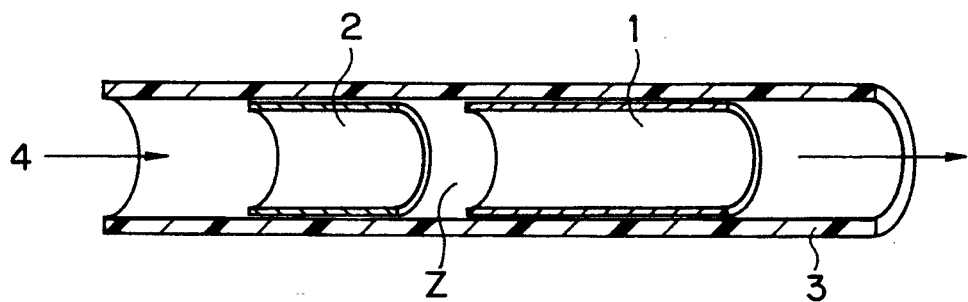
FIGS. 4–6 are perspective views, in section, of various forms of another embodiment of an apparatus for providing an ionic change in fluid according to the present invention.
Figure 5:
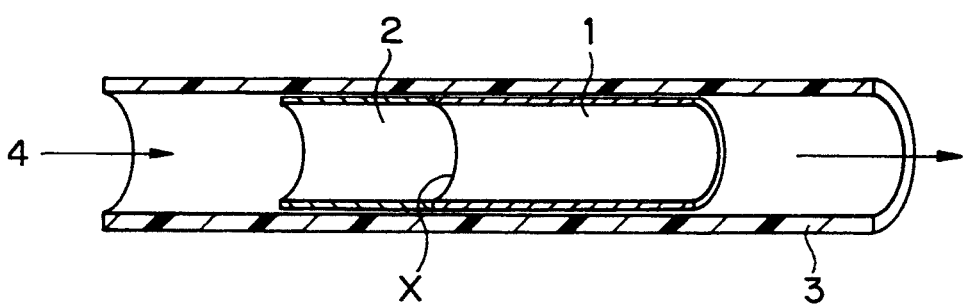
Figure 6:
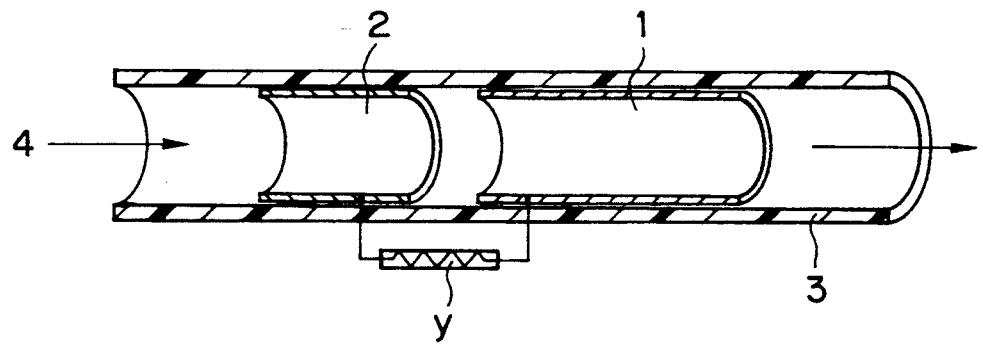

FIGS. 4-6 show the various electroconductive connections which can be provided between the positive and negative electrodes.

In FIG. 4, the electrically conductive materials of the negative 2 and positive 1 electrodes are spaced apart at "z" so as to be electrically isolated from one another. When the fluid flows in the direction of arrow 4, the fluid will thus form the only electroconductive connection between the electrodes.

In FIG. 5, the electrodes are shown abutting end-to-end at "x" so as to be in direct physical contact.

In FIG. 6, a resistor "y" is provided between the electrically conductive materials of the electrodes and in an electrically conductive relationship therewith. By selecting a resistor with an appropriate value of resistance, the rate at which the ionic change in the fluid occurs can be controlled.

Figure 7:
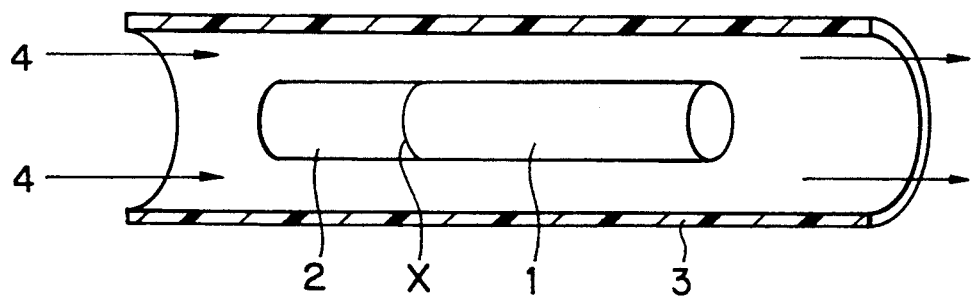
FIG. 7 is a perspective view, partly in section, of yet another embodiment of an apparatus for providing an ionic change in fluid according to the present invention.

FIG. 7 shows the manner in which the rod-shaped electrodes are provided within the tube 3. In the embodiment of FIG. 7, the electrodes 1, 2 are disposed radially inwardly of the tube 3 of electrically insulative material and in end-to-end direct physical contact.

Figure 8:
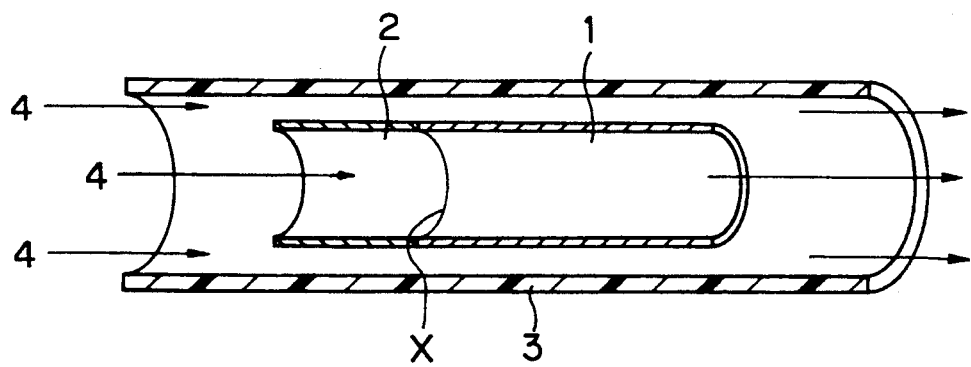
FIG. 8 is a perspective view, in section, of yet another embodiment of an apparatus for providing an ionic change in fluid according to the present invention.

In a similar embodiment as shown in FIG. 8, the electrodes 1, 2 are again tubular but are disposed radially inwardly of the tube 3 of electrically insulative material. This embodiment has the advantage in that the electrodes 1, 2 present a relatively large surface area to the fluid (at the inner and outer peripheral surfaces of the electrodes) thereby providing a correspondingly higher effect.

Figure 9:
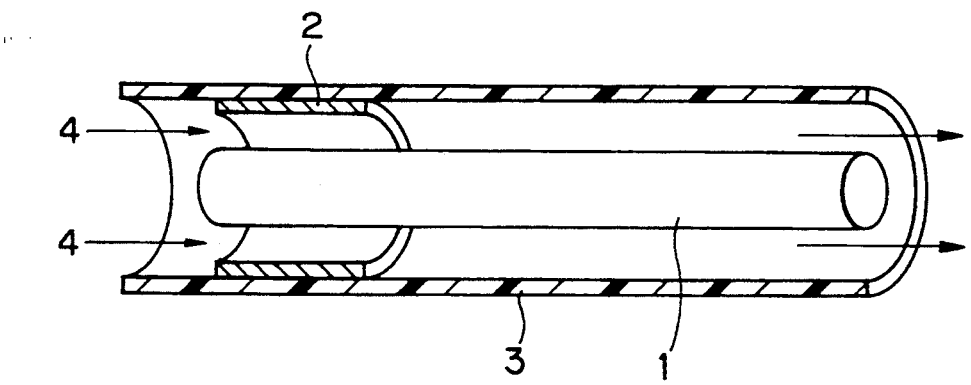
FIG. 9 is a perspective view, partly in section, of still yet another embodiment of an apparatus for providing an ionic change in fluid according to the present invention.

FIG. 9 shows that a combination of tubular and rod-shaped electrodes can be employed. In this case, the rod-shaped electrode 1 extends from a location radially inwardly of the tubular electrode 2 to a location spaced axially thereof in the tube 3 so as to provide for the required sequential contact of the fluid. Furthermore, although this embodiment is only effective for fluid flowing in the direction of arrows 4, if the electrode 1 extends in the opposite direction from the electrode 2, then fluid flow can be in either direction through the tube as in the embodiments of FIGS. 1 and 2.

In each of the embodiments above, it should be noted that the structure ensures that the fluid contacts the electrodes in a desired sequence. For the purpose of providing decoloration, the fluid must exit from the positive (carbon) electrode after contacting the negative (iron) electrode.

Again, referring to FIGS. 4-6, the electrodes may be electroconductively connected in any one of three states:

(1) with the electrodes in direct physical contact,
(2) with a resistor connected between the positive and negative electrodes, and
(3) with the electrodes being electrically isolated such that the fluid forms the only electroconductive connection between the electrodes.

With the connection (1) above (FIG. 5), an electric current is generated between the electrodes within the fluid flowing thereover. A release of a high level of ions (Fe) into the fluid accompanies this flow of electric current with the negative (iron) electrode being slowly consumed. With the connection (2), the resistor reduces the amount of current flow and consequently reduces the release of ions into the fluid resulting in a reduced rate of consumption of the negative (iron) electrode. With the connection (3), because only the fluid provides an electroconductive connection between the electrodes, a higher voltage potential exists with a corresponding minimum current flow such that the negative (iron) electrode is consumed extremely slowly.

Thus, these connections can be used as required to suit various levels of performance.

However, in view of the fact that the iron electrode was consumed quickly when in direct contact with the carbon electrode, and in view of the fact that the carbon electrode was observed to rust even when in the open circuit condition as electrically isolated from the carbon electrode, it was decided to use a stainless steel electrode instead of the iron electrode. Testing with such a stainless steel electrode showed reliable results in which the consumption of the iron was severely reduced and the rusting was completely eliminated.

In view of the very complex nature of the fluid (water) and the dissolved content, plus the further complexity of the electrochemical effects as created by the application of electric energy or potential through the fluid, it is extremely difficult to know the true and full effects of the electrochemical changes which take place under such complex circumstances. However, it seems apparent that the structure as described with the fluid flow contacting the electrodes in the specified sequence and exiting from the positive (carbon) electrode, causes an ionic change of the $Fe^{++}$.

When iron is converted to aqueous ions, the bivalent ion $Fe^{++}$ is predominant; however, in the bivalent ion $Fe^{++}$ an electron can be removed by the electrochemical effect and the fact that the carbon will accept electrons. The bivalent $Fe^{++}$ ion becomes an electron donor and the carbon the electron acceptor.

As the fluid flows through the tube of insulating material and contacts the electrodes in the specified sequence, according to the present invention, the ion $Fe^{++}$ comes into solution with the fluid which then comes in contact with the carbon electrode and is influenced by the electric energy or electric potential established between the iron electrode and the carbon electrode. The $Fe^{++}$ is caused to donate an electron to the carbon and is ionically changed.

As the fluid carrying the changed ion flows out of the device and into a containment system which has an $Fe_2O_3$ scale deposited thereon, the changed ion appears to have some affinity with the $Fe_2O_3$ which comes into solution and a complex hydrate of $(Fe.6H_2O)^{+++}$ may be produced which is colorless. In this manner the red/brown $Fe_2O_3$ in solution with the fluid (water) is converted to a colorless form of the hydrate.

The above-described principal of operation of the present invention is theoretical. However, the tests carried out with iron/carbon combination of electrodes do provide results which appear to bear this theory out.

Namely, as discussed above, it was found that an iron/carbon combination of electrodes not enclosed in an insulating tube provided no advantage; in fact, the coloration caused by the $Fe_2O_3$ was increased. The iron/carbon combination electrodes enclosed in a tube of insulating material (plastic) with the fluid exiting from the iron electrode also provided an apparent increase of coloration. However, a very positive effect of reduced coloration was obtained when the fluid flow was reversed with the water exiting from the carbon electrode.

A further observation was that when various forms of the device were tested, not only was the coloration of the fluid very much delayed, but when coloration did occur with the fluid flow exiting from the carbon electrode it was a much lighter brown color than otherwise. Also if the test unit was allowed to stand for a considerable time and a precipitate allowed to deposit, the color of the precipitate was a very light brown whereas a precipitate as normally observed with $Fe_2O_3$ has a very much darker color, and may be described as a red/brown color.

Although the above-described operating principal of the device has been described in terms of simple conditions of the water (fluid), the complex nature of water must also be considered. With the flow of electric energy through the water some ionic changes also occur with the solute of the water. The calcium and magnesium salts normally contained in water are also ionized and there is a very complex mixture of Fe ions, Ca ions, Mg ions and several other ions to a lesser degree. All of these active ions will be acted on resulting in some electrochemical changes in the system. Therefore, other combinations of electrodes may be used to suit different requirements. A positive carbon electrode and a negative copper electrode, or carbon and chromium or carbon and zinc electrodes for example, may be employed as long as an electric potential difference is created when the electrodes are immersed in a fluid electrolyte. The important feature of the invention is, however, ensuring that the fluid contacts the electrodes in a sequential manner, and most essentially that the exiting fluid must leave the device as principally affected by only one of the electrodes. The nature of the exit electrode is selected according to the type of effect required for a particular application.

Further, although the present invention has been described as effecting an ionic change to control the iron oxide coloration of a fluid, as is applicable in water containment systems, it is obvious that the present invention is of use in other applications. The present invention can be adopted to produce a REDOX reaction in which an electron can be removed from an aqueous ion or an electron can be added to an ion. As explained in the foregoing when the fluid (water) passed from an iron electrode (the donor electrode) to the carbon electrode (the acceptor electrode) the aqueous $Fe^{++}$ ion was changed, and in the reverse case with the flow from the carbon electrode to the iron electrode there was an increase in the rate and degree of production of the $Fe_2O_3$ in the water.

Furthermore, the above description has been related to using normal water (tap water) as the electrolyte. However, it is obvious that a selected electrolyte with selected positive and negative electrodes may be used to bring about more controlled REDOX reactions for laboratory work or other industrial purposes.

Finally, it is to be noted that numerous other advantages, changes and modifications will become apparent to those skilled in the art. Accordingly, such changes and modifications, which are seen to be within the true spirit and scope of the present invention, are to be understood as encompassed by the present invention as defined by the appended claims.

What is claimed is:

1. A method of providing an ionic change in fluid containing a compound in solution in said fluid, said method comprising:

providing a tube of electrically insulative material;

providing a positive electrode of electrically conductive material in said tube;

providing a negative electrode of electrically conductive material, comprising an element which is the same as an element included in a compound in solution in the fluid and having an electrochemical potential different from that of the electrically conductive material of said positive electrode, in said tube with at least some of the electrically conductive material of one of said electrodes being disposed downstream of all of the electrically conductive material of the other of said electrodes in the axial direction of said tube and with the electrically conductive materials of said positive and said negative electrode being electrically isolated from each other; and causing the fluid to flow through said tube in said axial direction so as to first contact the electrically conductive material of said other of said electrodes and then contact said at least some of the electrically conductive material of said one of said electrodes such that the fluid forms the only electroconductive connection between the electrodes, whereby ions of said element come into solution with the fluid and act on said compound in solution in the fluid to effect an ionic change in the fluid.

2. A method of providing an ionic change in fluid as claimed in claim 1, and further comprising disposing said tube of electrically insulative material with said electrodes therein in-line in a system of piping at a location upstream of a deposit of $Fe_2O_3$ scale in the system and in which system some of the $Fe_2O_3$ from the deposit is picked up and carried by the fluid, and wherein the step of providing a negative electrode comprises providing an iron electrode, wherein the step of providing a positive electrode comprises providing a carbon electrode as the downstream electrode, and the step of causing the fluid to flow comprises causing fluid to flow through said tube in the axial direction so as to first pass over the electrically conductive material of said iron electrode and then pass over at least some of the electrically conductive material of said carbon electrode, whereby the ionic change in the fluid results in the decoloration of the fluid where the $Fe_2O_3$ scale is deposited.

3. A method of providing an ionic change in fluid, said method comprising:

providing a tube of electrically insulative material;

providing a carbon positive electrode of electrically conductive material in said tube;

providing an iron negative electrode of electrically conductive material, so as to have an electrochemical potential different from that of the carbon of said positive electrode, in said tube with at least some of the carbon of said positive electrode being disposed downstream of all of the iron of the negative electrode in the axial direction of said tube;

disposing said tube of electrically insulative material with said electrodes therein in-line in a system of piping at a location upstream of a deposit of $Fe_2O_3$ scale in the system and in which system some of the $Fe_2O_3$ is picked up and carried by the fluid; and effecting an ionic change in the fluid without using any external source of power by causing fluid to flow through said tube in the axial direction so as to first pass over the iron of said negative electrode and then pass over at least some of the carbon of said positive electrode, whereby ions of iron come into solution with the fluid and act on the $Fe_2O_3$ in solution in the fluid such that the ionic change in the fluid results in the decoloration of the fluid where the $Fe_2O_3$ scale is deposited.

4. A method of providing an ionic change in fluid containing a compound in solution in said fluid, said method comprising:

providing a tube of electrically insulative material;

providing a positive electrode of electrically conductive material in said tube;

providing a negative electrode of electrically conductive material, comprising an element which is the same as an element included in a compound in solution in the fluid and having an electrochemical potential different from that of the electrically conductive material of said positive electrode, in direct end-to-end contact with said positive electrode in said tube with at least some of the electrically conductive material of one of said electrodes being disposed downstream of all of the electrically conductive material of the other of said electrodes in the axial direction of said tube; and effecting an ionic change in the fluid without using any external source of power by causing the fluid to flow through said tube in said axial direction so as to first contact the electrically conductive material of said other of said electrodes and then contact said at least some of the electrically conductive material of said one of said electrodes whereby ions of said element come into solution with the fluid and act on said compound in solution in the fluid.

5. A method of providing an ionic change in fluid containing a compound in solution in said fluid, said method comprising:

providing a tube of electrically insulative material;

providing a positive electrode of electrically conductive material in said tube;

providing a negative electrode of electrically conductive material, comprising an element which is the same as an element included in a compound in solution in the fluid and having an electrochemical potential different from that of the electrically conductive material of said positive electrode, and electrically isolated from the positive electrode in said tube with at least some of the electrically conductive material of one of said electrodes being disposed downstream of all of the electrically conductive material of the other of said electrodes in the axial direction of said tube; and effecting an ionic change in the fluid without using any external source of power by causing the fluid to flow through said tube in said axial direction so as to first contact the electrically conductive material of said other of said electrodes and then contact said at least some of the electrically conductive material of said one of said electrodes such that the fluid forms the only electroconductive connection between the electrodes whereby ions of said element come into solution with the fluid and act on said compound in solution in the fluid.

* * * * *